(12) United States Patent
Larson et al.

(10) Patent No.: US 6,228,929 B1
(45) Date of Patent: May 8, 2001

(54) ELECTRICALLY CONDUCTIVE RUBBER COMPOSITION AND ARTICLE OF MANUFACTURE, INCLUDING TIRE, HAVING COMPONENT THEREOF

(75) Inventors: Brent Kevin Larson, Fairlawn; Melissa Marie Beauvais, Akron, both of OH (US); Glenn Ervin Gasner, Silver Springs, MD (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 09/397,973

(22) Filed: Sep. 16, 1999

(51) Int. Cl.$^7$ ...................................................... C08K 3/04
(52) U.S. Cl. ...................... 524/495; 524/496; 152/152.1
(58) Field of Search .................... 524/495, 496; 152/152.1

(56) References Cited

U.S. PATENT DOCUMENTS

| | | | |
|---|---|---|---|
| 3,875,558 | * | 4/1975 | Samples .................................. 340/58 |
| 4,017,654 | * | 4/1977 | Evans et al. ............................ 428/40 |
| 5,143,967 | * | 9/1992 | Krishnan et al. ..................... 524/496 |
| 5,520,231 | * | 5/1996 | Myatt ................................. 152/152.1 |
| 5,714,533 | * | 2/1998 | Hatakeyama et al. ................ 524/140 |
| 5,743,973 | * | 4/1998 | Krishnan et al. ................. 152/152.1 |
| 5,872,178 | * | 2/1999 | Kansupada et al. ................. 524/496 |
| 5,898,047 | * | 4/1999 | Howald et al. .................. 152/209 R |
| 6,044,882 | * | 4/2000 | Crawford et al. ................ 152/152.1 |
| 6,070,630 | * | 6/2000 | Pompei et al. ..................... 152/152.1 |

OTHER PUBLICATIONS

Algger M., Polymer Science Dictionary, Chapman and Hall, London UK. p. 422, 1997.*

Brandrup J., Immergut E.H., Grulke E.A.; Polymer Handbook, 4th Ed. Wiley and sons, New York, NY pp. VI/207–VI/212, 1999.*

* cited by examiner

*Primary Examiner*—Edward J. Cain
*Assistant Examiner*—Katarzyna L. Wyrozebski
(74) *Attorney, Agent, or Firm*—Henry C. Young, Jr.

(57) ABSTRACT

An electrically-conductive rubber composition and article of manufacture having a component thereof. In one aspect, such article of manufacture is a pneumatic rubber tire of a toroidal shape having a cavity designed to be substantially enclosed by the toroidal shape of the tire and its closure completed by a rigid rim onto which the tire is designed to be mounted. In another aspect, such pneumatic tire contains such rubber composition positioned on or within a rubber innerliner of the tire; wherein the innerliner is a surface of said cavity. In a further aspect, said rubber composition is an annular strip of an electrically-conductive rubber composition on or within such tire innerliner. The said annular strip is intended to be an antenna for having a capability of receiving electromagnetic waves from outside the tire and of transmitting electromagnetic waves from the inside of the tire to the outside of the tire.

9 Claims, 3 Drawing Sheets

RESISTIVITY CURVE

FIG-3

POWER CURVE

ELECTRICALLY CONDUCTIVE RUBBER COMPOSITION AND ARTICLE OF MANUFACTURE, INCLUDING TIRE, HAVING COMPONENT THEREOF

FIELD

This invention relates to an electrically-conductive rubber composition and article of manufacture having a component thereof. In one aspect, such article of manufacture is a pneumatic rubber tire of a toroidal shape having a cavity designed to be substantially enclosed by the toroidal shape of the tire and its closure completed by a rigid rim onto which the tire is designed to be mounted. In another aspect, such pneumatic tire contains such rubber composition positioned on or within a rubber innerliner of the tire; wherein the innerliner is a surface of said cavity. In a further aspect, said rubber composition is an annular strip of an electrically-conductive rubber composition on or within such tire innerliner. The said annular strip is intended to be an antenna for having a capability of receiving electromagnetic waves from outside the tire and of transmitting electromagnetic waves from the inside of the tire to the outside of the tire.

BACKGROUND

Pneumatic tires are conventionally of a toroidal shape which defines a cavity which is substantially enclosed by the tire and the closure is conventionally completed by mounting the tire on an intended rigid rim. The tire conventionally has a rubber innerliner which is actually an exposed surface of the tire cavity. Such pneumatic tire configurations are conventional as would be understood by one having skill in such art.

Pneumatic tires usually rely upon air pressure to maintain their shape and associated performance during service conditions, although some pneumatic tires may be designed to hold their shape and provide representative performance, at least for limited times, even though they may have lost or are not able to maintain their internal air pressure for various reasons. For the purpose of the description of this invention, such tires are considered herein to be pneumatic tires even though they might be designed to run without an internal air pressure for limited periods of time.

For various applications, it may be desirable to provide a pneumatic rubber tire with a sensing device on or within its inner surface which has a capability of electronically receiving power generated from an electromagnetic wave generating source outside the tire and transmitting various data relating to the tire such as, for example, its internal air pressure relative to an external transmitting and receiving device.

It may be desirable to provide such a tire with a suitable antenna as an actual part of the tire for both receiving various electromagnetic signals from an exterior source and for transmitting various electromagnetic signals from within the tire to an external receiving device.

It may also be desirable to utilize a flexible rubber composition with relatively low electrical resistance to both physically and electrically connect various electrical devices such as, for example, connecting a microprocessing device or chip, which is positioned on or within an inner surface of the tire to an electrical wire.

In the case of one electrically-conductive element such as, for example, an electrically-conductive metal wire, it is envisioned herein that the rubber composition of this invention may be used to electrically connect at least two portions of the same element in the case of one element or of a multiplicity of elements in the case of two or more elements.

Accordingly, it is envisioned that a suitably electrically-conductive rubber composition would be desirable for connecting said microprocessing device to at least one additional non-rubber, electrically-conductive element such as, for example, a wire or other metallic electrical element or conductor, especially where considerable flexing at the point of connecting the electrical conductor to the microprocessor, or other electrical device or element, is concerned.

It is also envisioned, in one aspect, that such electrically-conductive rubber composition may be in a form of an aforesaid antenna as an annular strip of rubber positioned on or in a tire innerliner.

Such an antenna will necessarily have a suitable electrical-conductivity for its purpose and have a suitable elastomeric properties for compatibility with the inner rubber surface of the tire itself.

An example of use of an electrically-conductive rubber on an inner surface of a tire may be found, for example, in U.S. Pat. No. 5,743,973.

An important requirement for such electrically-conductive rubber composition is not only that it be relatively electrically conductive but, also, that it have physical properties suitable for inclusion within a tire component so that the electrical conductivity be maintained over time.

For the description of this invention, the term "phr" refers to "parts by weight of a designated ingredient in a rubber composition per 100 parts by weight of rubber".

The terms "rubber" and "elastomer" are considered herein to be interchangeable unless otherwise indicated and, for the purposes of this description, a liquid rubber, which may be a diene hydrocarbon-based liquid rubber or an isobutylene-based liquid rubber, even though it is a liquid, it is referred to herein as a "rubber" which, upon curing, has rubbery properties. Non-liquid rubbers may be referred to herein as "solid rubbers".

The terms "rubber compound" and "rubber composition", or "elastomer composition", where used, are considered herein to be interchangeable unless otherwise indicated.

SUMMARY AND PRACTICE OF THE INVENTION

In accordance with this invention, an electrically-conductive rubber composition is provided which is essentially free of and, therefore, preferably exclusive of, oil, particularly petroleum-based processing oil and is comprised of, based on 100 phr of rubber, (A) about 50 to about 95, alternatively about 70 to about 80, phr of at least one solid rubber, (B) about 5 to about 50, alternatively about 20 to about 30, phr of a liquid rubber selected from at least one of liquid diene-hydrocarbon liquid rubber and isobutylene based liquid rubber, and (C) about 10 to about 160, preferably about 30 to about 130, phr of at least one carbon black having an Iodine value (ASTM D1510) within a range of about 190 to about 1500, alternatively about 900 to about 1400, g/kg and a DBP value (ASTM D2414) within a range of about 110 to about 500, alternatively about 300 to about 500, cm$^3$/100 g.

In further accordance with this invention, said solid rubber may be selected from (a) diene hydrocarbon-based rubbers as homopolymers and copolymers of conjugated diene hydrocarbons such as, for example, isoprene and 1,3-butadiene and copolymers of at least one conjugated diene hydrocarbon selected from isoprene and 1,3-butadiene with a vinyl aromatic compound selected from styrene and alpha-methylstyrene, preferably styrene, as well as tin coupled organic solvent solution polymerization prepared polymers of at least one of isoprene and 1,3-butadiene and copolymers of isoprene and/or 1,3-butadiene with styrene, or (b) an isobutylene-based rubber as a butyl rubber or halogenated butyl rubber as a copolymer, or halogenated copolymer, of isobutylene and a minor amount (e.g. from about 2 to about 8 phr) of a conjugated diene hydrocarbon such as, for example, isoprene.

In additional accordance with this invention, said liquid rubbers may be selected from (a) liquid conjugated diene hydrocarbon-based rubbers selected from polymers of at least one of isoprene and 1,3-butadiene and copolymers of isoprene and 1,3-butadiene with styrene or alpha-methylstyrene, preferably styrene or (b) an isobutylene-based rubber as, for example a copolymer of isobutylene and from about 2 to about 8 weight percent isoprene or such copolymer which has been halogenated with a halogen such as, for example, chlorine or bromine.

In the practice of this invention, if the solid rubber is a diene hydrocarbon-based rubber composition, then the liquid rubber is preferably also a diene hydrocarbon-based rubber for compatibility or the liquid rubber with the solid rubber purposes.

Correspondingly, if the solid rubber is an isobutylene-based rubber, then the liquid rubber is preferably also an isobutylene-based liquid rubber for compatibility of the liquid rubber with the solid rubber purposes.

The said liquid rubber may, for example, have an average molecular weight (weight average), for example, within a range of about 10,000 to about 50,000, although its average molecular weight may be higher or lower.

In practice, it is to be appreciated that the rubber composition of the tire component (e.g.: tire innerliner) with which it is contemplated that the said electrically-conductive rubber strip is to be associated, typically has a volume resistivity of at least $1 \times 10^8$ ohm-cm and even up to at least $1 \times 10^{-12}$ ohm-cm or higher.

In contrast, it is preferred that the rubber composition of this invention has a volume resistivity within a range of about 0.5 to about 500, preferably within about 0.5 to about 100, and more preferably within a range of about 0.5 to about 10 ohm-cm.

Significantly, it is sometimes preferred that the said solid rubber is primarily, and preferably exclusively, at least one of synthetic cis 1,4-polyisoprene and tin coupled synthetic cis 1,4-polyisoprene. Such elastomers are well known to those having skill in such art and are conventionally prepared by organic solvent polymerization of isoprene. The tin coupling of the elastomer may be accomplished, for example, by reacting the elastomer, before its polymerization of its monomer precursors) is terminated, with a tin compound such as, for example tin tetrachloride, and such tin coupling of elastomer process is well known to those having skill in such art.

Significantly, the rubber composition of this invention also contains an appreciable amount of liquid diene-based polymer, preferably liquid polyisoprene as will be hereinafter discussed.

Also significantly, as might be expected, carbon black reinforcing filler is used which desirably promotes a relatively low volume electrical resistivity for the rubber composition of this invention, as will be hereinafter discussed.

In practice, said rubber composition may be preferably prepared by mixing said rubber composition in at least one sequential mixing step in an internal rubber mixer having at least one rotor mixing blade, in the absence of sulfur and peroxide curatives, to a maximum temperature of less than 180° C., usually less than 170° C., thus usually within a range of about 150° C. to about 170° C. or even up to about 180° C.; wherein for each mixing step, the composition is mixed to a substantial minimization (e.g. within about 30 percent of such minimization) of a resultant volume resistivity of the rubber composition when subsequently cured.

While it may take some experimentation by a practitioner to determine where such minimization takes place, such minimization may be relatively readily determined, particularly as hereinafter discussed.

It is to be appreciated that the rubber composition is then mixed in a final mixing step in an internal mixer with sulfur and curatives to a maximum temperature of less than 120° C., sometimes less than 115° C., therefore usually within a range of about 95° C. to about 120° C., for a brief period of time, namely less than 4, preferably less than 2 or 3 minutes, and therefore usually within a range of about 1.5 to about 4 minutes.

An alternative to the above experimentation for determining process conditions for achieving the aforesaid relative minimization of volume resistivity is as follows:

In practice, said rubber composition may be prepared by mixing said rubber composition in at least one sequential mixing step in an internal rubber mixer having at least one rotor mixing blade, in the absence of sulfur and peroxide curatives; wherein for each mixing step, the composition is mixed for a suitable period of time to a temperature of less than 170° C. and to substantially a minimization of the mixing torque experienced by the internal mixer for mixing the rubber composition. Preferably said substantial minimization is within about 50 percent, alternatively within 20 percent, of the minimum mixing torque experienced subsequent to an initial maximum mixing torque for mixing the rubber composition.

In practice, the rotor speed of rotation is substantially constant with a variation in mixing speed of the mixer of less than about ten percent.

While a suitable period of time for the above mixing may vary considerably depending, for example, on the rotor speed of the mixer and circulating cooling water, if any, for the mixer, as well as choice of elastomers and concentration of said liquid polymer and carbon black, it is envisioned that such individual mixing period per mixing step may be readily determined by the practitioner and may be, for example, from about 1.5 to about three minutes.

A purpose of controlling the mixing of the rubber composition and basing the mixing upon torque of mixing is to limit, to some extent, the homogeneous dispersion of the carbon black and to, therefore, create a less than homogeneous dispersion within the rubber composition.

As hereinafter shown in FIGS. 3 and 4 which accompany this invention disclosure, a minimization of the volume electrical resistivity of the rubber composition has been observed to substantially coincide with a minimization of the mixing torque for an internal rubber mixer for the rubber composition.

Also, it has been reported in "Conductive Rubbers and Plastics", supra, that a less than homogeneous. dispersion of carbon black in a rubber composition has been observed to provide a lower, and typically more desirable, electrical resistance for the rubber composition.

In accordance with this invention, an article of manufacture is provided which contains at least one component comprised of the rubber composition of this invention.

In additional accordance with this invention, an article of manufacture is comprised of at least one, usually at least two, electrically-conductive elements, preferably metallic elements, which are electrically and preferably physically connected together with the rubber composition of this invention.

In further accordance with this invention, an article of manufacture is an industrial product selected from hoses and belts having at least one component comprised of the rubber composition of this invention. Exemplary of such industrial product is a conveyor belt and a power transmission belt.

In additional accordance with this invention, a tire is provided having at least one component which is comprised of the rubber composition of this invention.

For said tire, preferably a pneumatic tire, said component is an assembly comprised of said rubber composition which physically and electrically connects at least one, and usually at least two, electrically-conductive metallic elements or devices together with said rubber composition positioned between said metallic elements.

In further accordance with this invention, a pneumatic rubber tire is provided which contains an annular strip of said electrically-conductive rubber composition positioned circumferentially on, within or co-extensive with an innerliner rubber surface of said tire; wherein said electrically-conductive rubber strip has a thickness in a range of about 0.1 to about 5, preferably in a range of about 0.5 to about 2, millimeters and a volume resistivity within a range of about 0.5 to about 500, alternately about 0.5 to about 50, and preferably within a range of about 0.5 to about 10, ohm-cm and, where said strip is essentially free of oil, particularly rubber processing oil, preferably exclusive thereof and, therefore, contains from zero up to and including about 5 phr of oil such as, for example, from about one to about five phr of oil.

In practice, such pneumatic tire is of a conventional toroidal shape having an inherent cavity; wherein said cavity is designed to be closed by a rigid rim, and wherein said strip is positioned on or within the rubber surface of said cavity at or near the centerline of the tire.

In one aspect of this invention, said annular rubber strip is an antenna within the tire which is designed to receive electromagnetic waves, (e.g. radio frequency waves) within the tire from an electromagnetic transmitting means, or source, outside the tire and to transmit electromagnetic waves from within the tire to a receiving means for an electromagnetic wave.

In particular, such antenna is designed to transmit information from within the tire to an information receiving means outside of the tire. In practice, it is contemplated that the said antenna is to transmit information, or data, by radio frequency transmission.

Preferably, the annular strip of rubber is positioned at approximately the centerline of the tire and preferably on or within a rubber innerliner of the tire.

In one aspect of the invention, the electrically-conductive rubber strip, or antenna, is circumferentially positioned at the inner surface of the tire cavity (e.g. a tire innerliner) having a discontinuous portion thereof comprised of two ends of said strip individually connected to a microprocessor chip which may be embedded within the tire innerliner. In particular, said ends of the strip are individually and electrically and physically connected to one or more electrically-conductive metallic elements of a microprocessor chip; wherein said chip may be positioned between said ends of said strip.

Accordingly, then, a means is provided of electrically connecting at least two portions of at least one electrically conductive element which comprises positioning the rubber composition of this invention between at least two of said portions to electrically connect said portions.

Also accordingly, then, a means is provided herein for receiving electromagnetic signals from an electromagnetic signal generating means outside of a tire and for transmitting electromagnetic signals from within the tire to an electromagnetic signal receiving means outside of the tire which comprises providing a tire with an antenna within the tire; wherein said antenna is comprised of an annular strip of the rubber composition of this invention positioned circumferentially on, within or coextensive with an innerliner rubber surface of said tire; wherein said electrically-conductive rubber strip has a thickness in a range of about 0.1 to about 5 millimeters and, wherein said rubber composition is characterized by having a volume resistivity within about 0.5 to about 500 ohm-cm and, wherein the strip has a discontinuous segment where each individual end of the strip is physically and electrically connected to a microprocessor chip with said chip positioned near, and sometimes between, said ends of said strip.

In practice, the said electrically-conductive strip, or antenna, may have a width in a range of about 5 to about 20, alternatively about 5 to about 12, cm, depending somewhat upon the tire size and electrical demands of the embedded microprocessor chip.

While metal elements of said microprocessor chip may be of various forms, it is contemplated that they may be in a form of wires, plates or other configurations. Such metal elements may be of various conductive metals such as, for example, steel, copper, alloys thereof including brass, and including steel wires which have a copper, brass or zinc coating thereon.

It is to be appreciated that the thin, electrically-conductive rubber strip, or antenna, can be laid over a portion of the said metal elements, be wrapped around one or more of the said metal elements, may encapsulate or partially encapsulate one or more of the said metal elements or, alternatively, at least one of the metal elements may be sandwiched between two strips of the conductive rubber composition. Other variations may occur to the practitioner.

In another aspect of the invention, the electrically-conductive rubber composition may be embedded or partially embedded in at least one rubber component of the pneumatic tire. While such rubber component of the tire may be, for example, the tire's carcass, its sidewall, its innerliner, or other tire component as may occur to the practitioner, for this invention, it is preferable that the rubber composition is in a form of said strip and is a part of the tire's innerliner. While it is usually desired that the electrically-conductive rubber strip is completely embedded within one or more components of the tire, it is envisioned that some part of the strip might not be completely embedded within a tire component and, thus, presents an exposed surface to the interior of the tire.

While it is envisioned that the electrically-conductive strip, or antenna, of this invention is to be of a rubber composition comprised of elastomers of conjugated diene-based monomers having from 4 to 8 carbon atoms, preferably from at least one of isoprene and 1,3-butadiene, alternatively copolymerized with styrene, it is also envisioned that the rubber composition may be comprised of a butyl or halobutyl rubber (e.g. bromobutyl rubber) where the strip is to be positioned on or within a tire innerliner where the innerliner itself is composed of a butyl or halobutyl rubber in order to enhance its compatibility with the tire innerliner.

For a further understanding of the invention, reference is made to the accompanying drawings.

In the drawings.

Figure 1:
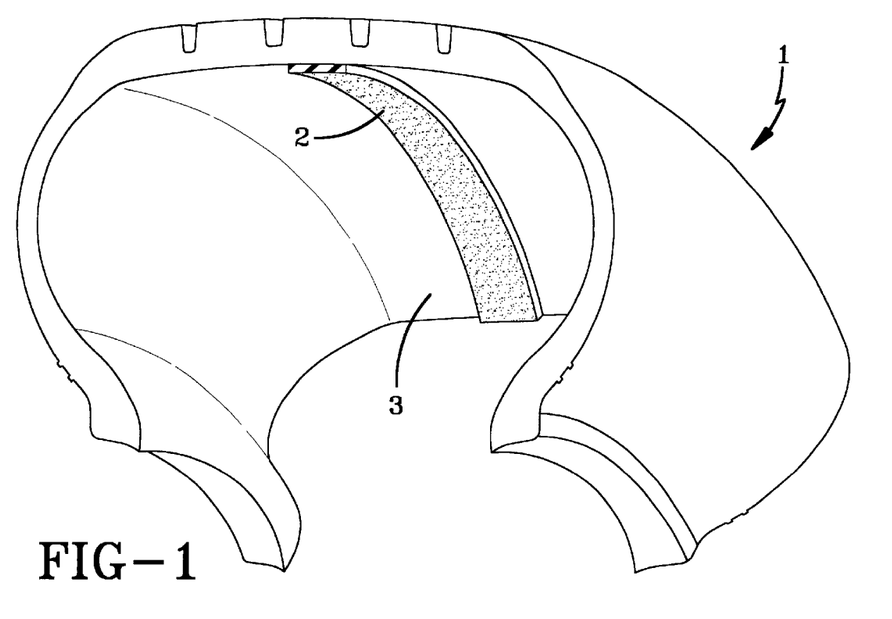
FIG. 1 is a cross-sectional, perspective view of a toroidally-shaped pneumatic tire showing an electrically-conductive rubber strip positioned on its inner surface. The strip of the electrically-conductive rubber is designed to function as an antenna for receiving and/or transmitting power and/or information.

In particular, FIG. 1 is a perspective view of a tire cross-section (1) as shown in which a portion of an annular electrically conductive rubber strip (2) is positioned at the centerline of the tire's inner surface (3). The tire's inner surface (3) is the innerliner of the tire and is the inner surface of the tire's cavity. While the strip (2) is shown as being positioned on top of the inner surface (3), it is to be understood that it is most likely that its exposed surface will be flush, or substantially even, with the surface of the innerliner (3).

Figure 2:
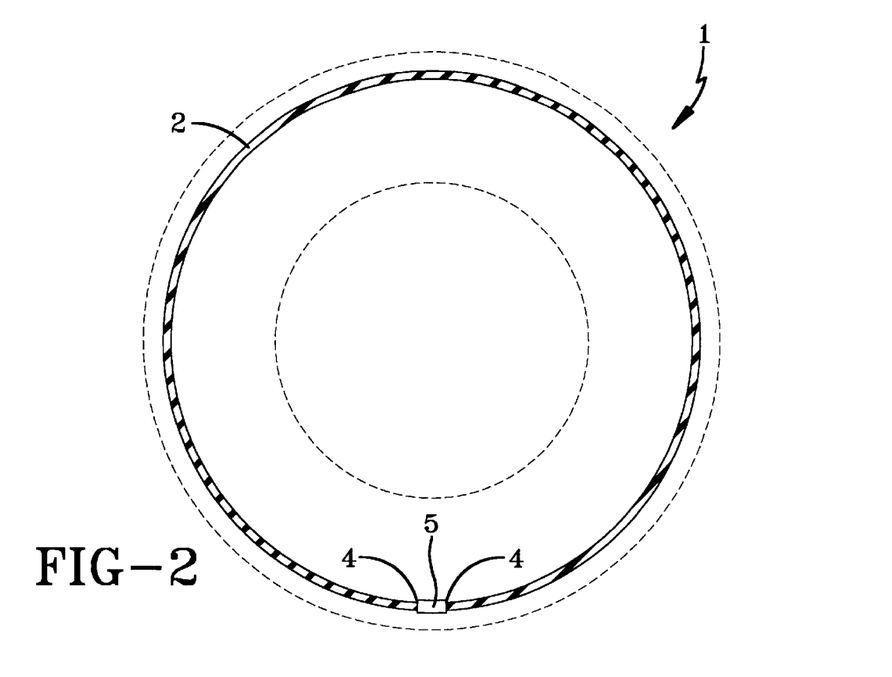
FIG. 2 is a cross-sectional view of a pneumatic tire showing an annularly positioned strip, or antenna, with its ends terminating at a microprocessor chip.

FIG. 2 is a cross-sectional view of the tire showing the annular strip (2) and its ends (4) individually terminating by being both physically and electrically connected to a microprocessor chip (5).

Figure 3:
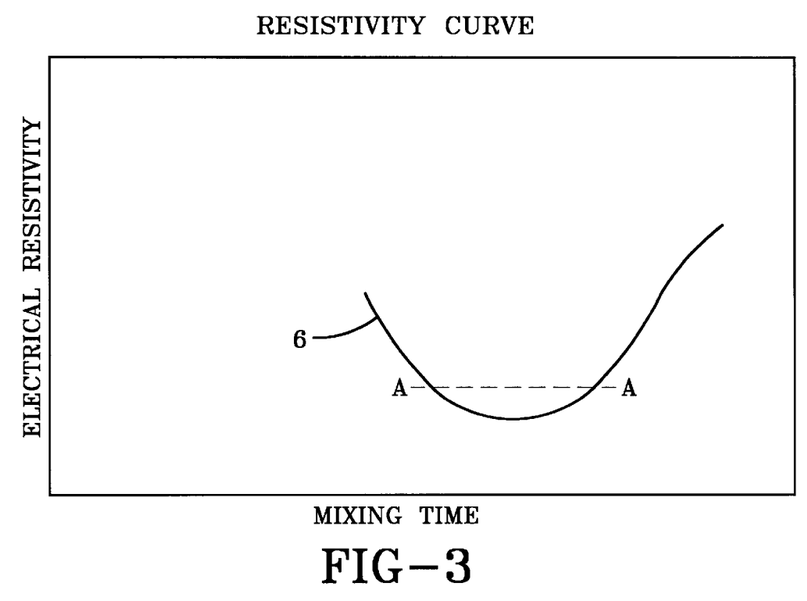
FIG. 3 depicts a curve of volume resistivity for the cured rubber composition versus mixing time for the uncured rubber composition.

FIG. 3 is intended to be a graph as being representative of a simulation of a curve of volume resistivity (ohm-cm) of a cured rubber composition for the strip of this invention plotted against mixing time for the uncured rubber composition in an internal rubber mixer.

In particular, FIG. 3 is intended to show the volume resistivity of the cured rubber composition decreasing to a relatively and desirably low value of electrical resistivity in region (A—A) of the curve (6) over time as the uncured rubber composition is mixed and then increasing to higher, and less desirable resistivity values, as the mixing is continued.

Figure 4:
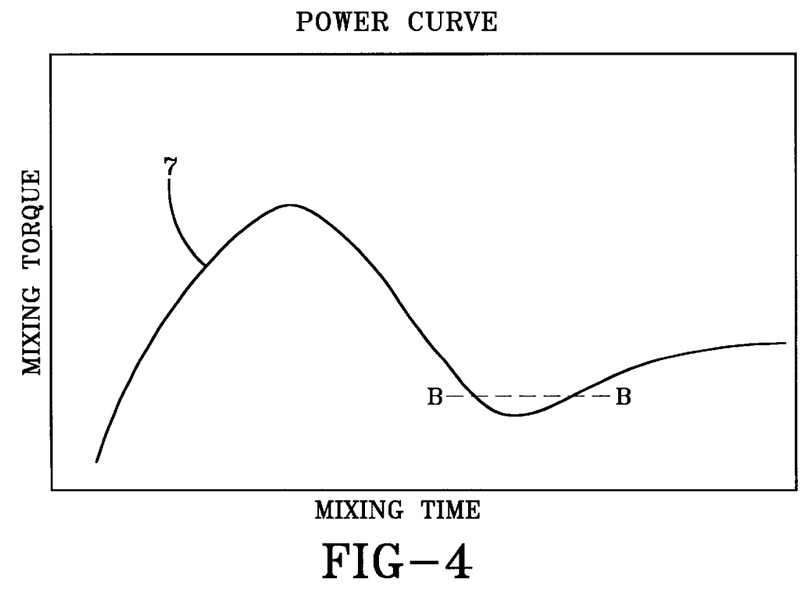
FIG. 4 depicts a curve of torque utilized for mixing the rubber composition versus mixing time.

FIG. 4 is intended to be a graph as being a representative simulation of mixing torque (e.g.: MPa) for an uncured rubber composition of this invention also plotted against mixing time in an internal rubber mixer.

In particular, FIG. 4 is intended to show that the mixing torque tends to decrease to a low value and minimum torque in region (B—B) of the curve (7) over time as the uncured rubber composition is mixed and then increases to higher values.

In practice, it has been observed that the aforesaid minimization of the electrical resistivity region (A—A) for the cured rubber composition and minimization of the mixing torque region (B—B) for the uncured rubber composition substantially coincide.

Therefore, it is a desirable aspect of this invention that the preparation of the rubber composition for the electrically-conductive strip of this invention is prepared by mixing the ingredients in an internal rubber mixer for a suitable period of time to minimize the aforesaid mixing torque in order to correspondingly minimize the electrical resistivity of the resultant sulfur-vulcanized rubber composition.

For a discussion concerning minimization of electrical resistivity of a carbon black reinforced rubber composition by limiting the mixing of the rubber composition, see "Conductive Rubbers And Plastics" by R. H. Norman (1970), published by Applied Science Publishers Ltd, London, pages 50–53.

While a primary consideration of this invention is the implementation of the electrically-conductive rubber strip, particularly designed to be an antenna for receiving and/or transmitting power and/or information, secondary consideration is for the electrically-conductive rubber composition to have suitable rubber properties to be relatively compatible with the tire component with which it is to be embedded, or at least partially embedded.

Accordingly, and in one aspect, it is desired for the vulcanized, electrically-conductive rubber composition to have physical properties such as an ultimate tensile strength at 23° C. in a range of about 10 to about 20 MPa, an ultimate elongation at 23° C. in a range of about 200 to about 700 percent, a 200 percent modulus at 23° C. of about 10 to about 15 MPa, a 100 percent modulus at 23° C. of about 3 to about 7 MPa and a Shore A hardness in a range of about 70 to about 90.

Representative of solid rubbers or elastomers for the conductive rubber composition are, for example, elastomers selected from at least one of homopolymers and copolymers of 1,3-butadiene and isoprene; copolymers of 1,3-butadiene and/or isoprene and a vinyl aromatic hydrocarbon such as styrene or alpha-methylstyrene; butyl and halobutyl rubber such as chlorobutyl and bromobutyl rubber as the aforesaid copolymers of isobutylene and minor amount of conjugated diene hydrocarbon and halogenated isobutylene copolymers.

Representative examples of such elastomers are, for example, cis 1,4-polybutadiene, trans 1,4-polybutadiene, syndiotactic polybutadiene, polyisoprene whether natural or synthetic, styrene/butadiene copolymer rubber whether solution or aqueous emulsion polymerization prepared, isoprene/butadiene copolymer rubber, styrene/isoprene copolymer rubber and styrene/isoprene/butadiene terpolymer rubber.

A further example of elastomers are tin coupled, solution polymerization prepared elastomers as cis 1,4-polyisoprene, cis 1,4-polybutadiene and isoprene/butadiene copolymers.

In practice, such electrically-conductive rubber composition for said strip is preferably primarily composed of synthetic cis 1,4-polyisoprene rubber or tin coupled cis 1,4-polyisoprene rubber insofar as its rubber content is concerned.

However, it may be preferred that the solid rubber component is primarily, or preferably exclusively, of a butyl rubber or halogenated butyl rubber.

It is to be appreciated that butyl rubber is typically a copolymer of isobutylene and about 1 to about 6 percent of a conjugated diene such as isoprene and that a halogenated butyl rubber (e.g. bromine) is such a copolymer which has been post halogenated.

Accordingly, it is contemplated that the electrically-conductive rubber composition may be comprised of, for example, and based upon 100 parts by weight rubber (phr), (A) about 50 to about 95, alternately about 70 to about 80, phr of (i) at least one of solid synthetic cis 1,4-polyisoprene rubber and tin coupled synthetic cis 1,4-polyisoprene rubber, (ii) at least one solid diene-based rubber selected from natural and synthetic cis 1,4-polyisoprene, synthetic cis 1,4-polybutadiene, copolymers of isoprene and 1,3-butadiene, and copolymers of isoprene and/or 1,3-butadiene with a vinyl aromatic compound such as, for example, styrene and/or alpha-methylstyrene and tin coupled elastomers of cis 1,4-polyisorene, cis 1,4-polybutadiene, isoprene/butadiene copolymers and styrene/butadiene copolymers or (iii) a solid copolymer of isobutylene and conjugated diene such as isoprene and/or a solid copolymer of isobutylene and such conjugated diene which is halogenated with chlorine or bromine, (B) about 5 to about 50, alternatively about 30 to about 40, phr of (i) at least one liquid rubber selected from polyisoprene, polybutadiene, isoprene/butadiene copolymers and styrene/butadiene copolymers when said solid rubber is a diene hydrocarbon-based rubber or (ii) at least liquid rubber selected from copolymers of isobutylene and isoprene which contains from about 2 to about 8 weight percent units derived from a conjugated diene hydrocarbon such as, for example, isoprene, and from said isobutylene copolymers which have been halogenated with chlorine or bromine when said solid rubber is an isobutylene-based rubber, and (C) about 10 to about 160, alternately about 30 to about 130, phr of carbon black having a particle size in a range of about 10 to about 30 nanometers (nm), an Iodine value in a range of about 190 to about 1500, alternatively about 900 to about 1500, $m^2/g$ (ASTM D1510), and a dibutylphthalate (DBP) value in a range of about 110 to about 500, alternatively about 300 to about 500, $cm^3/100$ g (ASTM D2414) so long as the sulfur cured, or vulcanized, rubber composition has the aforesaid volume resistivity within a range of about 0.5 to about 500, alternately about 0.5 to about 100, and preferably about 0.5 to about 10, ohm-cm.

It is recognized that some adjustment may be made by the practitioner as to the choice of elastomers or other rubber compounding ingredients, including carbon blacks, depending upon physical properties and level of volume resistivity desired which is considered herein to be within the skill of one having skill in the rubber compounding art.

In practice, it is desired that the carbon black for the electrically-conductive rubber composition is an especially electrically-conductive carbon black.

Representative examples of carbon blacks contemplated for use in the electrically-conductive rubber composition for the electrically-oriented composite are, for example and not intended to be limited to, carbon blacks having a BET surface area (ASTM D3037) in a range of about 200 to about 1250, alternatively about 800 to about 1200, m$^2$/g.

Exemplary of various carbon blacks for use in this invention are, for example: (A) acetylene black; (B) Printex XE-2 carbon black from the Degussa A.G. Company having a BET surface area of about 1000 m$^2$/g; a CTAB surface area of about 620 m$^2$/g; an Iodine number of about 1000 mg/g; an average diameter of about 30–35 nanometers (nm); and a DBP value of about 350-410 cm/100 g; (C) Ketjenblack EC-600JD carbon black from Akzo Nobel Chemicals Inc. having a BET surface area of about 1250 m$^2$/g; an Iodine number of about 975 to 1175 mg/g; and a DBP value of about 350–410 cm/100 g and (D) Black Pearls 2000 carbon black from the Cabot Corporation having a BET surface area of about 1000 m$^2$/g; an Iodine number of about 1400 mg/g; and a DBP value of about 330 cm/100 g.

Extra conductive carbon blacks such as, for example, the above-referenced carbon blacks from Degussa, Akzo and Cabot, are particularly preferred carbon blacks for the rubber strip.

The electrical volume resistivity is not measured directly, but is calculated from (1) a measured resistance of a sample in ohms and (2) the geometrical size and shape parameters of the sample. For example, see "Conductive Rubbers And Plastics" by R. H. Norman (1970), published by Applied Science Publishers Ltd, London, pages 24–29.

By the term "volume resistivity" of a vulcanized rubber sample, it is meant the value calculated by the formula:

$$r=(R)(A)/(L)$$

where r is the volume resistivity in ohm-cm, (R) is resistance in ohms for a sample of constant cross-section, (A) is the cross-sectional area of the rubber sample in cm$^2$ and (L) is the distance between electrodes connected to the rubber sample in cm.

Thus, the volume resistivity is, therefore, to be distinguished from simple resistance which is conventionally expressed in terms of ohms.

The resistance (R) may be measured by an ohm-meter. It is important that the connection between the ohm-meter electrodes and the rubber sample provide an insignificant resistance. For example, it has been found that an acceptable connection may be made via brass wires with their ends vulcanized within the rubber sample. (See the aforesaid "Conductive Rubbers And Plastics" reference, pages 12–16). Nominal dimensions of the vulcanized rubber sample may be, for example, about 100 mm long×20 mm wide×3 mm thick. Two wires are individually embedded about 10 mm from each end of the sample at a distance "L" apart of about 80 mm (8 cm). The value for "L" is entered into the above equation.

Figure 5:
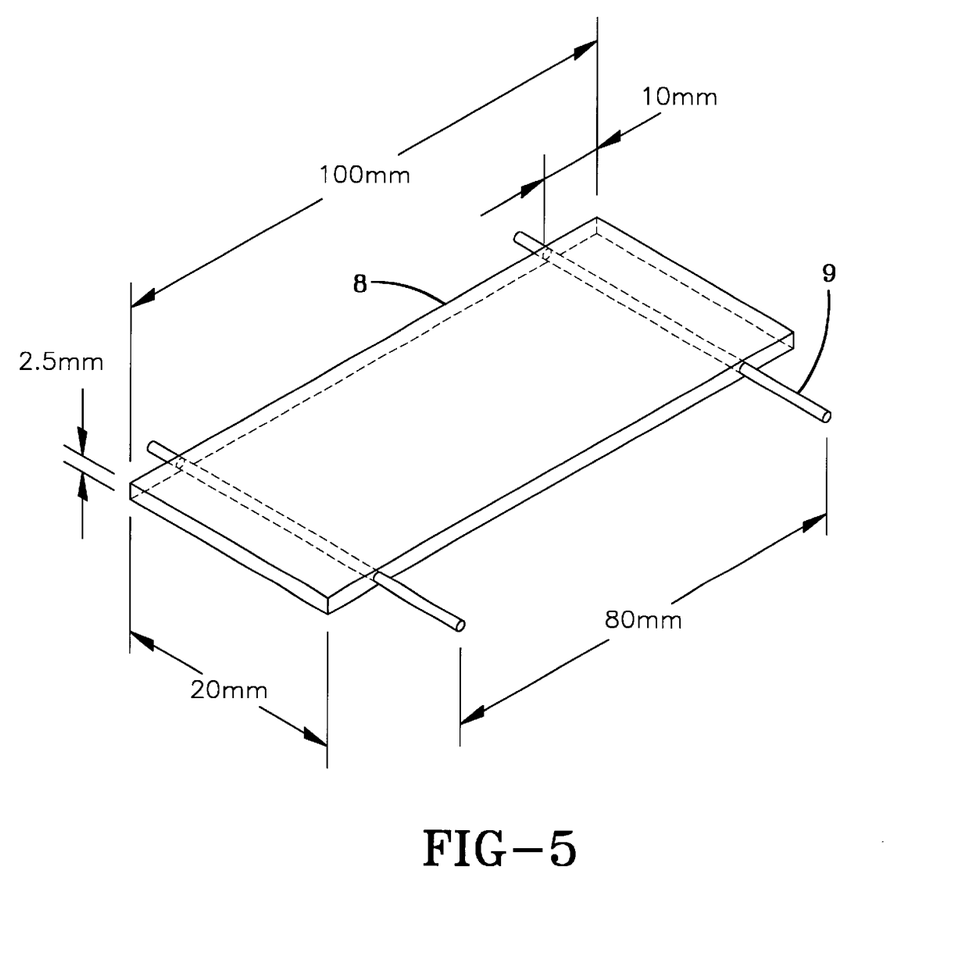

For a further understanding of the measurement of volume resistivity, reference is made to the accompanying drawings in which FIG. 5 shows a typical rectangular test sample (8) as described above with two individual brass coated steel wires (9) embedded in and through the 20 mm width of the test sample (8), namely one wire embedded about 10 mm from each end of the test sample with the wires (9) themselves being a distance "L", or 80 mm, apart from each other.

It is readily understood by those having skill in the art that the rubber compositions may be compounded by mixing the various sulfur-vulcanizable constituent rubbers with various commonly-used additive materials such as, for example, curing aids, such as sulfur, activators, retarders and accelerators, processing additives, such as resins including tackifying resins, and plasticizers, fillers, pigments, fatty acid, zinc oxide, waxes, antioxidants and antiozonants, peptizing agents and reinforcing materials such as, for example, the aforesaid carbon black. As known to those skilled in the art, depending on the intended use of the sulfur vulcanizable and sulfur vulcanized material (rubbers), the additives mentioned above are selected and commonly used in conventional amounts.

Peroxide cure could also be used in a fashion known to those skilled in the art, particularly where butyl rubber or halobutyl rubber is used (e.g. chlorobutyl or bromobutyl rubber).

Typical amounts of carbon blacks(s) for use in this invention have hereinbefore been discussed.

For the electrically-conductive rubber composition to be used: tackifier resins, if used, comprise about 0.5 to about 10 phr, usually about 1 to about 5 phr. Rubber processing oil is definitely not desired. Typical amounts of antioxidants comprise about 1 to about 5 phr. Representative antioxidants may be, for example, diphenyl-p-phenylenediamine and others, such as, for example, those disclosed in *The Vanderbilt Rubber Handbook* (1978), pages 344–346. Typical amounts of antiozonants comprise about 1 to 5 phr. Typical amounts of fatty acids, if used, which can preferably be primarily stearic acid, may comprise about 0.5 to about 5 phr. It is to be appreciated that stearic acid commonly used for rubber compounding purposes is typically composed of about 30 to about 80 weight percent stearic acid and the remainder being typically primarily composed of other saturated, fatty acids like saturated $C_{12}$, $C_{14}$, $C_{16}$ and $C_{20}$ chains. Such material, in such a relatively impure state, is commonly referred to in the rubber compounding practice as "stearic acid" and is so referred to in the description and practice of this invention.

Typical amounts of zinc oxide can be, for example, about 2 to about 5, and sometimes even up to about 15, phr. Typical amounts of waxes comprise about 1 to about 5 phr. Often microcrystalline waxes are used. Typical amounts of peptizers, if used, comprise about 0.1 to about 1 phr. Typical peptizers, if used, may be, for example, pentachlorothiophenol and dibenzamidodiphenyl disulfide.

The vulcanization is conducted in the presence of a sulfur-vulcanizing agent. Examples of suitable sulfur-vulcanizing agents include elemental sulfur (free sulfur) or sulfur donating vulcanizing agents, for example, an amine disulfide, polymeric polysulfide or sulfur olefin adducts. Preferably, the sulfur-vulcanizing agent is elemental sulfur. As known to those skilled in the art, sulfur-vulcanizing agents are used in an amount ranging from about 0.5 to about 4 phr, or even, in some circumstances, up to about 8 phr, with a range of from about 1.0 to about 3.5, sometimes from 2 to about 3 being preferred.

Accelerators are used to control the time and/or temperature required for vulcanization and to improve the properties of the vulcanizate. In one embodiment, a single accelerator system may be used, i.e., primary accelerator. Conventionally and preferably, a primary accelerators is used in total amounts ranging from about 0.5 to about 4, preferably about 0.8 to about 2.0, phr. In another embodiment, combinations of a primary and a secondary accelerator might be used with the secondary accelerator being used in amounts of about 0.05 to about 3 phr in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound. The presence and relative amounts of sulfur-vulcanizing agent and accelerator(s) are not considered to be an aspect of this invention.

The presence and relative amounts of the above additives are not considered to be an aspect of the present invention which is more primarily directed to the preparation and use of an electrically-conductive rubber composition as a component of an article of manufacture and, particularly as an antenna within a pneumatic tire.

The mixing of the rubber compositions can be accomplished by methods known to those having skill in the rubber mixing art. For example, the ingredients are desirably mixed, as hereinbefore described, in at least two stages, namely, at least one non-productive stage followed by a productive mix stage. The final curatives are typically mixed in the final stage which is conventionally called the "productive" mix stage in which the mixing typically occurs at a temperature, or ultimate temperature, lower than the mix temperature(s) than the preceding non-productive mix stage (s). The rubber, carbon black and other ingredients are mixed in one or more non-productive mix stages. The terms "non-productive" and "productive" mix stages are well known to those having skill in the rubber mixing art.

The said electrically-conductive strip may be positioned on an inner surface of a pneumatic tire or at least partially embedded in a rubber layer component of the innersurface of the tire as hereinbefore discussed. Such tires can be built, shaped, molded and cured by various methods which are known and will be readily apparent to those having skill in such art.

The invention may be better understood by reference to the following examples in which the parts and percentages are by weight unless otherwise indicated, and the various rubbers, or elastomers, are solid rubbers unless otherwise specified.

EXAMPLE I

Electrically-conductive rubber compositions are prepared from the ingredients shown in the following Table 1 and extruding the resulting rubber composition into a form of a strip having a thickness of about 1 mm and a width of about 12 cm.

The rubber compositions were prepared by first mixing the ingredients, introduced at about 23° C. and exclusive of the sulfur and accelerator curatives and, therefore, referred to herein as "non-productive: mixing, in an internal rubber mixer with a jacketed temperature of about 100° C. at a constant rotor speed for about 2 minutes to a temperature of about 170° C. which was within about 10 percent of the observed minimum mixing torque following a first maximum mixing torque. It is contemplated herein that said mixing torque minimization corresponds substantially to a minimization of a volume resistivity of a resultant cured rubber composition.

The mixture was removed from the mixer and allowed to cool to about 23° C.

The resulting mixture was then mixed together with sulfur and accelerator curatives as well as zinc oxide and, therefore, referred to herein as "productive" mixing, in an internal rubber mixer for about 2 minutes to an autogeneously generated temperature of about 120° C.

The compositions are identified herein as Sample A and Sample B. Both are conductive rubber compositions according to this invention.

TABLE 1A

Non-Productive Mixing

| Material | Parts Sample A | Parts Sample B |
|---|---|---|
| Synthetic cis 1,4-polyisoprene rubber[1] | 70 | 0 |
| Tin-coupled cis 1,4-polyisoprene rubber[2] | 0 | 60 |
| Liquid rubber[3] | 30 | 40 |
| Antidegradant | 5 | 5 |
| Carbon black[4] | 130 | 0 |
| Carbon black[5] | 0 | 30 |
| Tackifying resin | 2 | 2 |
| Cobalt naphthanate | 1 | 1 |
| Zinc oxide | 5 | 5 |
| Stearic acid | 2 | 1 |

Conventional amounts of antidegradant(s) (para-phenylene diamine and hydroquinoline type), as well as fatty acid (stearic acid) zinc oxide, sulfur and accelerator of the sulfenamide type were used.
[1]Synthetic cis 1,4-polyisoprene as NATSYN ® 2200 from The Goodyear Tire & Rubber Company.
[2]Obtained as tin coupled organic solvent polymerization prepared cis 1,4-polyisoprene elastomer from The Goodyear Tire & Rubber Company.
[3]Liquid polyisoprene obtained as LIR 30 from the Kurary company (Japan) having a number average molecular weight of about 25,000, thus, within a range of about 20,000 to about 30,000.
[4]Carbon black as PA90 from Cabot Corporation as previously described.
[5]Carbon black as Ketjenblack EC-600JD, a trademark of Akzo Nobel Chemicals Inc. as previously described.

TABLE 1B

Productive Mixing

| Material | Parts Sample A | Parts Sample B |
|---|---|---|
| Zinc oxide | 3 | 3 |
| Antidegradant | 1 | 1 |
| Sulfur | 4.5 | 4.5 |
| Anti-reversion agent | 2 | 2 |
| Accelerators | 0.8 | 0.8 |

EXAMPLE II

The prepared rubber compositions were cured at a temperature of about 150° C. for about 20 minutes and the resulting cured rubber samples evaluated for their physical properties as shown in the following Table 2 as averages of the respective physical properties. Sample A and Sample B correspond to the Sample A and Sample B of Example I.

TABLE 2

| Properties | Sample A | Sample B |
| --- | --- | --- |
| Modulus (100%), MPa | 8.4 | 3.2 |
| Tensile strength, ult (MPa) | 13.8 | 12.9 |
| Elongation (%) | 210 | 740 |
| Volume resistivity (ohm-cm)[1] | 1.2 | 0.73 |

[1]Volume resistivity determined as hereinbefore described.

A typical volume resistivity for a sulfur-vulcanized rubber tire component to which the electrically-conductive strip is to be applied to or embedded in is at least about $1\times10^8$ ohm-cm which is contemplated as being somewhat exemplary of a conjugated diene-based rubber composition containing about 45–55 phr of conventional rubber reinforcing carbon black.

It is readily seen from Table 2 that the electrical property, or volume electrical resistivity, for the sulfur-vulcanized Sample A in which the foundation elastomer is synthetic cis 1,4-polyisoprene rubber, namely, an electrically-conductive rubber composition for the strip, or rubber antenna, of this invention, is about 1.2 ohms-cm which is also clearly and substantially, by a large magnitude, more electrically-conductive than the aforesaid exemplary tire rubber component conventionally with a volume resistivity of at least 108 ohm-cm.

It is also readily seen from Table 2 that electrical property, or volume electrical resistivity, for the sulfur-vulcanized Sample B where the foundation elastomer is a tin coupled cis 1,4-polyisoprene rubber, namely, an electrically-conductive rubber composition for the strip, or rubber antenna, of this invention, is about 0.73 ohms-cm which is also clearly and substantially, by a large magnitude, more electrically conductive than the aforesaid exemplary tire rubber component.

Further, the physical properties of Samples A and B, namely the tensile strength and modulii, are considered herein to be in a range that indicates that the rubber compositions would be relatively compatible in a physical sense with a conventional rubber component of a tire.

EXAMPLE III

The rubber strip prepared according to Sample A of Example I was positioned on an annular fashion around the inner surface, namely on the innerliner, of an unvulcanized pneumatic tire. Brass coated steel wires were placed at the ends of the rubber strip to serve as connection points measuring volume resistivity in a manner hereinbefore described.

The assembly was placed into a suitable mold and vulcanized at a temperature of about 150° C. for about 60 minutes. The strip was pressed into the tire innerliner rubber by pressure of the mold so that the strip was flush with, or co-extensive with, the surface of the tire innerliner, yet the outer surface of the strip remained exposed and visible.

The vulcanized strip was tested for its electrical resistance by use of an ohm-meter connected to the aforesaid positioned brass coated steel wires and was determined to have a resistance of about 850 ohms.

While certain representative embodiments and details have been shown for the purpose of illustrating the invention, it will be apparent to those skilled in this art that various changes and modifications may be made therein without departing from the spirit or scope of the invention.

What is claimed is:

1. A tire having at least one component of comprised of an electrically conductive rubber composition having a volume resistivity, when cured, within a range of about 0.5 to about 10 ohm-cm, which is essentially free of oil, wherein said uncured rubber composition is comprised of, based on 100 phr of rubber,
    (A) about 50 to about 95 phr of at least one solid rubber,
    (B) about 5 to about 50 phr of a liquid rubber having a molecular weight within a range of 10,000 to 50,000 selected from at least one of
        (1) liquid polyisoprene liquid rubber, and
        (2) isobutylene-based liquid rubber, and
    (C) about 10 to about 160 phr of at least one carbon black having an Iodine value (ASTMD1510) within a range of 900 to 1400 g/kg and a DBP value (ASTMD2414) within a range of 300 to 500 cm$^3$/100 g;
    wherein said solid rubber is comprised of:
    (A) at least one of synthetic cis 1,4-polyisoprene and tin coupled synthetic cis 1,4-polyisoprene;
    (B) at least one of homopolymers and copolymers of isoprene and 1,3-butadiene and copolymers of at least one of isoprene and 1,3-butadiene with styrene, or
    (C) copolymer of isobutylene and from 2 to 8 weight percent of isoprene, said isobutylene copolymer halogenated with bromine;
    wherein said rubber composition is prepared by mixing said rubber composition in at least one sequential mixing step in an internal rubber mixer with at least one rotary mixing blade, in the absence of sulfur and peroxide curatives; wherein for each mixing step, the composition is mixed to a temperature in a range of about 150° C. to about 180° C. and to a mixing torque which is within 50 percent of the minimum mixing torque experienced subsequent to the maximum mixing torque for mixing the rubber composition; followed by mixing sulfur and/or peroxide curative with said rubber composition for about 1 to about 4 minutes to a temperature in a range of about 95° C. to about 120° C., and
    wherein said carbon black is less than homogeneously mixed in said rubber composition.

2. A tire having at least one component as an assembly comprised of an electrically conductive rubber composition which physically and -electrically connects portions of at least one electrically-conductive element with said rubber composition, wherein said rubber composition has a having a volume resistivity, when cured, within a range of about 0.5 to about 10 ohm-cm, which is essentially free of oil, wherein said uncured rubber composition is comprised of, based on 100 phr of rubber,
    (A) about 50 to about 95 phr of at least one solid rubber,
    (B) about 5 to about 50 phr of a liquid rubber having a molecular weight within a range of 10,000 to 50.000 selected from at least one of
        (1) liquid polyisoprene liquid rubber, and
        (2) isobutylene-based liquid rubber, and
    (C) about 10 to about 160 phr of at least one carbon black having an Iodine value (ASTMD1510) within a range of 900 to 1400 g/kg and a DBP value (ASTMD2414) within a range of 300 to 500 cm$^3$/100 g;
    wherein said solid rubber is comprised of
    (A) at least one of synthetic cis 1,4-polyisoprene and tin coupled synthetic cis 1,4-polyisoprene;
    (B) at least one of homopolymers and copolymers of isoprene and 1,3-butadiene and copolymers of at least one of isoprene and 1,3-butadiene with styrene, or
    (C) copolymer of isobutylene and from 2 to 8 weight percent of isoprene, said isobutylene copolymer halogenated with bromine;

wherein said rubber composition is prepared by mixing said rubber composition in at least one sequential mixing step in an internal rubber mixer with at least one rotary mixing blade, in the absence of sulfur and peroxide curatives; wherein for each mixing step the composition is mixed to a temperature in a range of about 150° C. to about 180° C. and to a mixing torque which is within 50 percent of the minimum mixing torque experienced subsequent to the maximum mixing torque for mixing the rubber composition; followed by mixing sulfur and/or peroxide curative with said rubber composition for about 1 to 4 minutes to a temperature in a range of about 95° C. to about 120° C., and wherein said carbon black is less than homogeneously sly mixed in said rubber composition.

3. The tire of claim 1 wherein, for the preparation of the rubber composition, said rotary mixing blade is operated at a substantially constant speed.

4. The tire of claim 1 wherein said solid rubber is selected from at least one of synthetic cis 1,4-polyisoprene and tin coupled cis 1,4-polyisoprene, so long as the rubber composition, when cured, has a volume resistivity within a range of 0.5 to 500 ohm-cm.

5. The tire of claim 1 wherein said solid rubber is said copolymer of isobutylene and isoprene, so long as the rubber composition, when cured, has a volume resistivity within a range of 0.5 to 500 ohm-cm.

6. The tire of claim 2 wherein said electrically conductive element is a metallic element.

7. The tire of claim 2 wherein, for the preparation of the rubber composition, said rotary mixing blade is operated at a substantially constant speed.

8. The tire of claim 2 wherein said solid rubber is selected from at least one of synthetic cis 1,4-polyisoprene and tin coupled cis 1,4-polyisoprene, so long as the rubber composition, when cured, has a volume resistivity within a range of 0.5 to 500 ohm-cm.

9. The tire of claim 2 wherein said solid rubber is said copolymer of isobutylene and isoprene, so long as the rubber composition, when cured, has a volume resistivity within a range of 0.5 to 500 ohm-cm.

* * * * *